US009553691B2

(12) United States Patent
Breton et al.

(10) Patent No.: US 9,553,691 B2
(45) Date of Patent: Jan. 24, 2017

(54) UNIDIRECTIONAL MULTICAST SYSTEM

(71) Applicant: CASSIDIAN CYBERSECURITY SAS, Elancourt (FR)

(72) Inventors: Sébastien Breton, Plaisir (FR); Eric Frank, Jouy le Moutier (FR)

(73) Assignee: CASSIDIAN CYBERSECURITY SAS, Elancourt (FR)

( * ) Notice: Subject to any disclaimer, the term of this patent is extended or adjusted under 35 U.S.C. 154(b) by 14 days.

(21) Appl. No.: 14/416,701

(22) PCT Filed: Jul. 24, 2013

(86) PCT No.: PCT/FR2013/000203
§ 371 (c)(1),
(2) Date: Jan. 23, 2015

(87) PCT Pub. No.: WO2014/016477
PCT Pub. Date: Jan. 30, 2014

(65) Prior Publication Data
US 2015/0180604 A1 Jun. 25, 2015

(30) Foreign Application Priority Data

Jul. 24, 2012 (FR) .................................... 12 02096

(51) Int. Cl.
*H04B 10/50* (2013.01)
*H04J 14/02* (2006.01)
*H04B 10/032* (2013.01)
(52) U.S. Cl.
CPC ......... *H04J 14/0238* (2013.01); *H04B 10/032* (2013.01)

(58) Field of Classification Search
CPC ...................................................... H04B 10/50
See application file for complete search history.

(56) References Cited

U.S. PATENT DOCUMENTS 7,284,050 B1 * 10/2007 Haridas ................... H04L 12/18
370/312
2002/0129159 A1 * 9/2002 Luby ....................... H04L 69/14
709/236

(Continued)

FOREIGN PATENT DOCUMENTS

| EP | 2 117 138 A1 | 11/2009 |
|----|----|----|
| JP | 56-094850 A | 7/1981 |
| WO | 01/95525 A2 | 12/2001 |

OTHER PUBLICATIONS

International Search Report issued in the International Patent Application No. PCT/FR2013/000203, dated Oct. 28, 2013.

*Primary Examiner* — Shi K Li
(74) *Attorney, Agent, or Firm* — Pillsbury Winthrop Shaw Pittman LLP

(57) ABSTRACT

A system for transmitting a message from a source entity to a target entity, the system including an input unit connected to the source entity in order to transmit the message via an optical transmission device to an output unit re-directing the message to the target entity. The optical transmission device is configured to transmit the message unidirectionally from the input unit to the output unit; and duplicate an optical input system containing the message into at least two optical output signals each containing the message to be transmitted to the output unit.

9 Claims, 3 Drawing Sheets

(56) References Cited

U.S. PATENT DOCUMENTS

| | | | |
|---|---|---|---|
| 2003/0016654 A1* | 1/2003 | Das | H04J 14/0284 370/351 |
| 2003/0051102 A1* | 3/2003 | Jacobs | G06F 17/30575 711/145 |
| 2011/0164672 A1* | 7/2011 | Jiang | H04N 19/39 375/240 |
| 2012/0051738 A1* | 3/2012 | Skirmont | H04B 10/0773 398/25 |
| 2012/0257627 A1* | 10/2012 | Nguyen | H04L 49/208 370/392 |
| 2013/0094855 A1* | 4/2013 | He | H04Q 11/0062 398/45 |

* cited by examiner

UNIDIRECTIONAL MULTICAST SYSTEM

CROSS REFERENCE TO RELATED APPLICATIONS

This application is the U.S. National Stage of PCT/FR2013/000203, filed Jul. 24, 2013, which in turn claims priority to French Patent Application No. 12/02096 filed Jul. 24, 2012, the entire contents of all applications are incorporated herein by reference in their entireties.

FIELD OF THE INVENTION

The present invention generally relates to the field of optical transmission. More particularly, the aim of the invention is to provide a unidirectional multicast optical system. Multicast means transmitting a data message coming from a source entity and duplicated into several identical messages to be transmitted to a target entity.

State of the Art and Technical Problems

A unidirectional transmission optical device comprising a source server is well known in order to transmit a message to a target server via an optical diode type device. The object of the optical diode device is to transmit a message in only one direction from the source server to the target server. Such a system allows the target server for processing sensitive data to receive data from the outside and prevents said target server from outputting sensitive data. No data return, such as an acknowledgment, is possible between the source server and the target server. A major drawback of this state of the art is that if the transmission is faulty or if the target server is unavailable, the transmitted message cannot be received and the source server is unable to know if it must retransmit the message.

There is therefore a need for a reliable faithful unidirectional optical transmission of messages from a source entity ensuring a proper reception of the message by a target entity. Faithful transmission means an error-free transmission, the received message being substantially identical to the message transmitted by the source server.

DISCLOSURE OF THE INVENTION

The aim of the present invention is to solve all the state of art drawbacks.

The object of the invention is therefore a system for transmitting a message from a source entity to a target entity, the system comprising an input unit connected to the source entity in order to transmit the message via an optical transmission device to an output unit re-directing the message to the target entity, the system being characterised in that the optical transmission device can:
- transmit the message unidirectionally from the input unit to the output unit; and
- duplicate an optical input signal containing the message into at least two optical output signals respectively containing the message to be transmitted to the output unit.

According to a first embodiment, the optical transmission device then comprises:
- an input optical switch in order to receive the message coming from the target entity and include the message into an optical signal to be transmitted to an optical duplicator via a first optical link,
- the optical duplicator in order to duplicate the received optical signal into at least two optical signals to be transmitted respectively to at least two output optical switches via respectively two optical links, and
- at least both output optical switches in order to retransmit the messages of both duplicated optical signals to the target entity.

The message transmission is unidirectional thanks to the optical duplicator which works as an optical diode thus blocking any message return from the target entity to the source entity.

The optical duplicator of the unidirectional transmission system of the invention also operates to multicast by duplication the received optical message into at least two optical signals containing the message, then by transmission of each of these messages to the target entity via respectively at least both optical links and at least both output switches. Thus, if one of both optical links or one of the output switches is faulty or unavailable, the target entity can receive the message coming from the non-faulty optical link or switch. This enables the probability of an inexpensive faithful transmission to the target entity to be, increased without a feedback loop from the target entity.

According to a second embodiment, the optical transmission device comprises a backup optical duplicator linked at the input to the input optical switch and at the output to both output optical switches.

According to a third embodiment, the optical transmission device comprises a backup optical switch linked to the input of at least one backup optical duplicator, the backup optical duplicator being linked at the output to both output optical switches.

The optical transmission device can also comprise a return optical link in order to transmit a duplicated signal to the input unit. This can correspond to a feedback loop controlling the proper reception of the message to the optical duplicator. Then, the first optical link and the optical duplicator can be considered as functioning properly.

The invention also comprises any of the following features:
- a message software duplication mechanism supervised by the input unit in order to transmit a series of identical messages,
- a message tagging mechanism per session and by software duplication supervised by the input unit,
- a message deduplication mechanism supervised by the output unit in order to detect the messages duplicated by software and/or the optical duplicator,
- a message correction and reconstruction mechanism supervised by the output unit, and
- a heartbeat mechanism generated by the input unit and controlled by the output unit in order to control the transmission system operation.

BRIEF DESCRIPTION OF THE FIGURES

The invention will be better understood upon reading the following description and upon examining the appended figures. These are given purely by way of illustration but limit in no way the invention. The figures show.

DESCRIPTION OF THE INVENTION

It should be now noticed that the figures are not drawn to scale.

The following embodiments are exemplary. Although the description refers to one or several embodiments, this does not necessarily mean that each reference relates to the same embodiment, or that the features only apply to a single embodiment. Simple features of different embodiments can also be combined in order to provide other embodiments.

In the remainder of the description, the following terms are defined as such:
- a message comprises payload to be transmitted from the source entity to the target entity,
- a data packet comprises a transmission header and a message, and
- an optical signal comprises the packet and thus the message.

Figure 1:
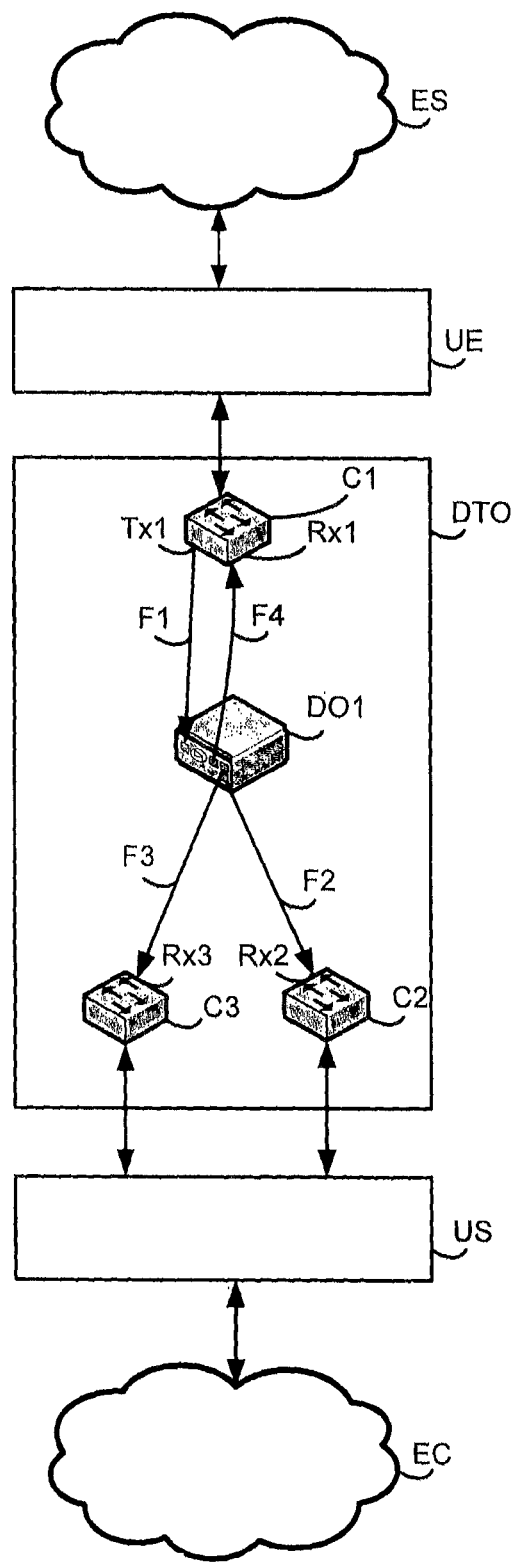
FIG. 1: a diagrammatic view of a unidirectional transmission system according to the invention.

The unidirectional multicast system according to invention, shown in FIG. 1, enables messages included in packets to be faithfully transmitted between a source entity and a target entity. The source entity can be a user terminal such as a computer or a server. The source entity can also be a set of terminals and servers linked as a communication network, for example an Internet network or an internal business network. The target entity can also comprise a user terminal or a server or a set of terminals and servers linked as a communication network, such as an Internet network or an internal business network. The unidirectional multicast system of the invention operates to transmit messages in only one direction, from the source entity to the target entity. According to the nature of the payload processed in one of both entities, the transmission system prevents either the leak of sensitive data coming from the target entity, or an intrusion of the target entity to the source entity.

In the first case, the target entity can be an internal business network processing limited-access data such as confidential medical data or group confidential data. The source entity can be an Internet network processing data that can be accessed by any user or of a lower sensitivity than the data processed by the target entity. The transmission system thus operates to transmit data unidirectionally from the source entity while preventing a leak of sensitive data from the target entity to the source entity. Preventing intrusion of the source entity in this case can be provided by firewall type software or equipment.

In the second case, the target entity can be an Internet network and the source entity an internal business network, the data processed by the target entity being less sensitive data than the data processed by the source entity. The transmission system thus operates to transmit unidirectionally data from the source entity while preventing an intrusion of the target entity into the source entity. Preventing the leak of sensitive data from the source entity can be provided by firewall type software or equipment.

The system of FIG. 1 comprises an input unit UE connected to the source entity ES, an optical transmission device DTO connected to the input unit UE and an output unit US connected between the optical output device and the target entity EC.

A packet coming from the source entity ES is transmitted by the input unit UE to the output unit US via the optical transmission device DTO in order to be redirected to the target entity EC. Such packets passing through the source entity and the target entity can be packet based on the telecommunications user data protocol UDP. The UDP protocol enables packets to be transmitted in a simple way between two entities, each being defined by an IP address and a port number. The UDP protocol works without a negotiation between both entities. As a result, the UDP protocol does not guarantee the delivery of packets to the target entity. The object of the system of the invention is therefore a high reliability faithful transmission of a message contained in a packet between the source entity and the target entity without an acknowledgment by the target entity in return.

According to another implementation, the packets passing through the source entity and the target entity can be packets based on the telecommunications transmission control protocol TCP. The TCP protocol works with a negotiation between both entities. In the case of the invention, a TCP message acknowledgment simulation device can be connected to the input unit. Thus, the system operates to transmit unidirectionally messages included in a packet without requiring an acknowledgment by the target entity. The acknowledgment necessary to the proper operation of the TCP protocol is ensured by the simulation device.

The input unit UE also enables IP (Internet Protocol) type data packets to be transmitted or received, in particular TCP (Transmission Control Protocol), UDP (User Data Protocol), ICMP (Internet Control Message Protocol) or SNMP (Simple Network Management Protocol) messages. The role of the unit UE is:
- to configure the transmission system for example by applying packets filtering rules, an access control policy, repetition parameters for messages to be transmitted,
- to supervise the transmission system by passing security alerts through the management of a firewall, by transmitting control messages to the output unit,
- to transmit messages to the target entity EC.

The role of the output unit US is to redirect or broadcast messages transmitted by the input unit UE to the target entity EC.

The role of the optical transmission device DTO is to transmit the packets in a single direction from the input unit to the output unit.

The transmission device comprises an input optical switch C1 connected to the input unit UE as an interface, such as an Ethernet interface of the 1000BASE-T standard. The switch C1 comprises an optical card containing a transmitter Tx1 and a receiver Rx1. The switch C1 transmits the packet via an optical signal.

The input switch is connected to an optical duplicator DO1, such as an optical coupler, via a first optical link F1, such as an optical fibre. The switch C1 transmits a converted optical signal to the optical duplicator DO1 via the link F1. The optical duplicator works as a diode and blocks any communication in the reverse direction from the output unit to the input unit. The duplicator is also used to duplicate the received optical signal in at least two optical signals to be retransmitted to the output unit. Both duplicated optical signals each comprise the same packet. The optical duplicator is a so-called passive duplicator. Passive duplication means a duplication which is not supervised by the input unit thus, any optical signal coming from the source entity and passing through the duplicator will be duplicated into at least two optical signals, the packets included in the signals being identical. Identical packets means packets having the same header and the same message. Duplication can be implemented by means of a prism diverging the optical beam. Another duplication mechanism enables the wavelengths to be separated in order to obtain different optical signals containing identical packets. The optical duplicator comprises at least two optical outputs each connected to a receiver Rx2, Rx3 respectively of first and second output switches C2, C3 via respectively second and third optical links F2, F3. Each output switch C2, C3 comprises an optical card containing a transmitter Tx2, Tx3 and a receiver Rx2, Rx3. The output switches C2 and C3 are connected to the output unit as interfaces such as Ethernet interfaces of the 1000BASE-T standard. Each output switch retrieves the packet from the optical signal and retransmits it on an electrical signal to the output unit US.

The optical duplicator operates to duplicate the input optical signal into at least two optical signals respectively comprising two identical packets and to distribute both optical signals on both optical links F2 and F3. Both duplicated signals are respectively transmitted to both receivers Rx2 and Rx3 of the switches C2 and C3 via the links F2 and F3.

In general, the optical duplicator can duplicate an input optical signal into N optical signals to be transmitted respectively to N output switches, N being an integer at least equal to 2.

The optical duplicator can also comprise a third output connected to the receiver Rx1 of the input switch C1 via a fourth optical link F4 in order to transmit a third duplicated signal to the switch C1. Thanks to this signal return, the input unit controls the operation of the optical link F1 and of the optical duplicator DO1.

According to an embodiment of the invention, the packets thus received by the output unit are entirely redirected to the target entity which will process them.

According to an alternative, the output unit comprises a deduplication mechanism for duplicated messages. This deduplication mechanism allows the output unit to detect the duplication of the messages and to transmit only one message to the target entity. The output unit can select the faithful message among the received duplicated messages. This mechanism can also be completed by a message correction mechanism detecting and correcting the transmission errors which could have occurred during the transfer on the optical link. In this case, the output unit reconstructs the message and transmits it to the target entity.

The deduplication mechanism relies on a message session tagging mechanism at the header of the packet in the input unit in order to facilitate the deduplication work in the output unit. Implementing the message tagging mechanism in the UDP protocol is made via the source port field of the header of the UDP packets. This range of free ports provides a number of data bits in order to encode different useful parameters within the transmission system.

Thus, a bit subfield is reserved for tagging the messages, indicating if the received messages to be processed belong to the same session or a different session. For example, a 7-bit subfield enables 128 simultaneous sessions to be managed.

Likewise, a bit subfield can be reserved to indicate to the output unit a version for encoding messages or of any other program presently operating in the transmission system. For example, a 3-bit field provides up to 8 different software versions.

Upon receiving the packets, the output unit detects in each packet, as a function of the tagging field, to which session the message belongs. The output unit then carries out a first ranking of the messages according to the session and selects the faithful message or corrects the message as a function of the different received messages of the same session. Finally, the output unit redirects the selected and/or corrected message to the target entity.

The output unit can comprise a message correction mechanism. According to an embodiment, upon receiving at least three messages of a same session, the correction mechanism is implemented in order to correct the message. This mechanism consists in simultaneously comparing each bit one by one in the three messages of the same session and in selecting the identical bit value for at least two of the duplicated messages. Once reconstructed, the message is transmitted to the target entity.

The three messages can come from three different output switches, each having received an optical signal duplicated by the optical duplicator and each containing a message of a same session. Or as explained later, the three messages can come from a repetition of a same message transmitted by the input unit and each contained in an optical signal duplicated into several optical signals by the optical duplicator.

The optical transmission system can also comprise a software duplication of the message to be transmitted, also called active duplication. Active duplication means a duplication supervised by the input unit. The same message is transmitted several times by the input unit. During the software duplication, packets containing the same message are not identical. Indeed, the header of each packet changes as a function of the tagging mechanism. In each message, the input unit tags the session number of the message and the repetition number of the message which is different from one packet to another. Thus, the source port field of the header can also comprise a reserved bit subfield in order to indicate the repetition number of a same message. For example, a 2-bit subfield enables the same message belonging to a same session to be repeated up to 4 times.

Upon transmitting these repeated messages, each optical signal containing each packet is duplicated by the optical duplicator to at least two output switches, thereby increasing the number of identical messages transmitted to the target entity. Statistically, the multiple sending of a same message between the input unit and the output unit increases the probability of a faithful transmission.

Upon receiving these messages, the output unit will store them in a memory, rank them according to their tagging and select the faithful message or correct the message as a function of all the received messages of a same session.

As previously indicated, the input unit UE can transmit control messages via the transmission system to the output unit for configuring and synchronizing both units UE and US. The control message transmitted at regular time intervals, with or without a supervision parameter, enables the proper operation of the transmission system to be indicated to the output unit. The control message can be considered in this case as the heartbeat of the system. If the control message does not reach the output unit in time, the output unit will therefore detect a failure of the transmission system.

Figure 2:
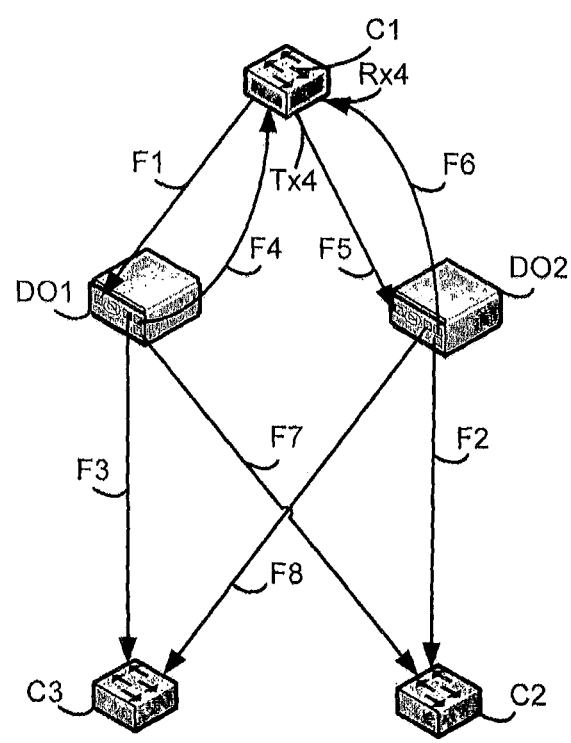
FIG. 2: a diagrammatic view of a first embodiment of a unidirectional transmission optical device of a high availability transmission system according to the invention.

FIG. 2 shows an alternative embodiment of the optical transmission device of a high availability message unidirectional transmission system. This system comprises at least one input switch C1, two output switches C2, C3 and two optical duplicators DO1, DO2.

Elements C1, DO1, C2 and C3 are connected as previously described with reference to FIG. 1. The input switch C1 also comprises a second optical card having a second transmitter Tx4 and a second receiver Rx4. The transmitter Tx4 is connected to the input of the second optical duplicator DO2 via a fifth optical link F5. One of the outputs of the optical duplicator DO2 is connected to the second receiver Rx4 via a sixth optical link F6 which allows the operation control return of the duplicator DO2.

The output switches C2, C3 also each comprise a second optical card having a second transmitter, and a second receiver. Each second receiver is connected to one of the outputs of the duplicator DO2 respectively via an optical link F7, F8.

Thus, in a default operation of the transmission system, the switch C1, the diode DO1 and the switches C2 and C3 are the ones that transmit the message from the input unit to the output unit.

If the switch C1 detects, through a non-return of the duplicated optical signal, that the duplicator DO1 is faulty, it transmits the optical signal to the second duplicator DO2 which will duplicate the signal and transmit it to both switches C2 and C3.

In this embodiment, a failure of the switch C1 is not taken into account.

Figure 3:
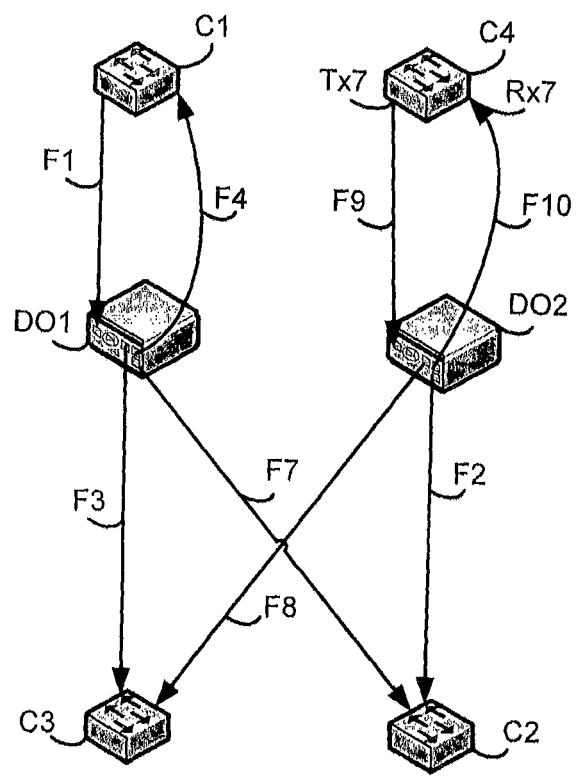
FIG. 3: a diagrammatic view of a second embodiment of a unidirectional transmission optical device of a high availability transmission system according to the invention.

FIG. 3 shows another embodiment of the optical transmission device of a high availability message unidirectional transmission system. This system comprises at least two input switches C1, C4, two output switches C2, C3 and two optical duplicators DO1, DO2.

Elements C1, DO1, C2 and C3 are connected as previously described with reference to FIG. 1. Elements DO2, C2 and C3 are connected as previously described with reference to FIG. 2. The second input switch C4 comprises an optical card having a transmitter Tx7 and a receiver Rx7. The transmitter Tx7 is connected to the input of the second optical duplicator DO2 via an optical link F9. One of the outputs of the optical duplicator DO2 is connected to the receiver Rx7 via an optical link F10 which allows the operation control return of the duplicator DO2. Thus, if a failure of the default switch C1 is detected by the input unit, the input unit will transmit the message to the second output switch C4 which will pass through the message to the output unit via the duplicator DO2 and the output switches C2 and C3.

Another embodiment of such a high availability transmission system can be implemented by connecting to each output switch of FIG. 3 two optical duplicators respectively as shown in FIG. 2. Thus, if the default input switch is faulty and if one of the optical duplicators connected to the backup switch is also faulty, then the signal can still pass through the backup switch, the backup optical duplicator connected to the backup switch and both output switches.

The invention claimed is:

1. A system for transmitting a message from a source entity to a target entity, said system comprising:
   an input unit;
   an optical transmission device, and
   an output unit,
   wherein the input unit is connected to the source entity to transmit the message via the optical transmission device to the output unit for re-directing the message to the target entity, and
   wherein the optical transmission device is configured for transmiting the message unidirectionally from the input unit to the output unit, and
   duplicating an optical input signal containing the message into at least two optical output signals respectively containing the message to be transmitted to the output unit
   the optical transmission device comprising:
   an input optical switch configured and arranged to receive the message coming from the source entity and to include the message into an optical signal to be transmitted to an optical duplicator via a first optical link,
   the optical duplicator being configured and arranged to duplicate the received optical signal into at least two duplicated optical signals to be transmitted respectively to at least two output optical switches via respective optical links,
   the at least two output optical switches being configured and arranged to retransmit the messages of the duplicated optical signals to the target entity; and
   a return optical link configured and arranged to transmit at least one of the duplicated optical signals to the input unit.

2. The transmission system according to claim 1, wherein the input unit comprises a message software duplication mechanism to transmit a series of identical messages.

3. The transmission system according to claim 1, wherein the input unit comprises a message tagging mechanism per session.

4. The transmission system according to claim 1, wherein the input unit comprises a message tagging mechanism by software duplication.

5. The transmission system according to claim 1, wherein the output unit comprises a message deduplication mechanism to detect the messages duplicated by software and/or the optical duplicator.

6. The transmission system according to claim 1, wherein the output unit comprises a message correction and reconstruction mechanism.

7. The transmission system according to claim 1, comprising a heartbeat mechanism generated by the input unit and controlled by the output unit in order to control the transmission system operation.

8. The transmission system according to claim 1, wherein the optical transmission device comprises a backup optical duplicator linked at the input to the input optical switch and at the output to the at least two output optical switches.

9. The transmission system according to claim 1, wherein the optical transmission device comprises a backup optical switch linked at the input of at least one backup optical duplicator, the backup optical duplicator being linked at the output to the at least two output optical switches.

* * * * *